(12) United States Patent
Van De Waerdt

(10) Patent No.: US 8,379,715 B2
(45) Date of Patent: Feb. 19, 2013

(54) SYSTEM AND METHOD FOR VIDEO COMPRESSION USING NON-LINEAR QUANTIZATION AND MODULAR ARITHMETIC COMPUTATION

(75) Inventor: Jan-Willem Van De Waerdt, San Jose, CA (US)

(73) Assignee: NXP B. V., Eindhoven (NL)

( * ) Notice: Subject to any disclaimer, the term of this patent is extended or adjusted under 35 U.S.C. 154(b) by 664 days.

(21) Appl. No.: 12/549,193

(22) Filed: Aug. 27, 2009

(65) Prior Publication Data

US 2011/0051802 A1 Mar. 3, 2011

(51) Int. Cl.
- H04B 1/66 (2006.01)
- H04N 7/12 (2006.01)
- H04N 11/02 (2006.01)
- H04N 11/04 (2006.01)

(52) U.S. Cl. .................................................. 375/240.03

(58) Field of Classification Search ........................ None
See application file for complete search history.

(56) References Cited

U.S. PATENT DOCUMENTS

| | | | | |
|---|---|---|---|---|
| 5,010,402 | A | * | 4/1991 | Nishino ..................... 348/401.1 |
| 5,650,829 | A | * | 7/1997 | Sugimoto et al. ............. 348/699 |
| 5,663,763 | A | * | 9/1997 | Yagasaki et al. ......... 375/240.03 |
| 5,726,711 | A | * | 3/1998 | Boyce ......................... 348/408.1 |
| 5,808,700 | A | * | 9/1998 | Sugimoto et al. ............. 348/699 |
| 6,625,217 | B1 | * | 9/2003 | Jacquin et al. ........... 375/240.19 |
| 6,697,433 | B1 | * | 2/2004 | Isu et al. .................. 375/240.27 |
| 2001/0028749 | A1 | * | 10/2001 | Kimura ......................... 382/240 |
| 2002/0054638 | A1 | * | 5/2002 | Hanamura et al. ....... 375/240.03 |
| 2002/0097918 | A1 | * | 7/2002 | Yokose ......................... 382/251 |
| 2005/0036545 | A1 | * | 2/2005 | Zhou ........................ 375/240.03 |
| 2005/0058205 | A1 | * | 3/2005 | Holcomb et al. ........ 375/240.23 |
| 2005/0276329 | A1 | * | 12/2005 | Adiletta et al. .......... 375/240.16 |
| 2006/0165171 | A1 | * | 7/2006 | Cha et al. ................. 375/240.12 |
| 2006/0233240 | A1 | * | 10/2006 | Cha et al. ................. 375/240.03 |
| 2009/0190843 | A1 | * | 7/2009 | Jung et al. ..................... 382/233 |
| 2010/0067810 | A1 | * | 3/2010 | Kishi ............................ 382/232 |

* cited by examiner

*Primary Examiner* — Ayaz Sheikh
*Assistant Examiner* — Peter Chau (57) ABSTRACT

A system and method for video compression utilizes non-linear quantization and modular arithmetic computation to perform differential coding on multiple blocks of video data and uses a result of the differential coding to generate a codeword.

17 Claims, 6 Drawing Sheets

SYSTEM AND METHOD FOR VIDEO COMPRESSION USING NON-LINEAR QUANTIZATION AND MODULAR ARITHMETIC COMPUTATION

Embodiments of the invention relate generally to video coding systems and methods and, more particularly, to a system and method for video compression.

In multimedia Systems on Chip (SoC), most of the video data is stored in off-chip memory. The multimedia SoC communicates with the off-chip memory through an SoC memory interface. However, video data communication between the off-chip memory and the multimedia SoC requires a large amount of bandwidth and the larger bandwidth requirement can increase the implementation cost of the off-chip memory and the SoC memory interface. Thus, there is a need for a system and method for video compression that can achieve compression efficiency and reduce component costs while maintaining an acceptable video quality.

A system and method for video compression utilizes non-linear quantization and modular arithmetic computation to perform differential coding on multiple blocks of video data and uses a result of the differential coding to generate a codeword. Performing differential coding using non-linear quantization provides good video quality and enables a low cost implementation of a multimedia SoC. Additionally, performing differential coding using modular arithmetic computation achieves a good compression ratio, reduces video data communication between a multimedia SoC and off-chip memory, and reduces the cost of implementation of the off-chip memory and the SoC memory interface between the multimedia SoC and the off-chip memory.

In an embodiment, a method for video compression involves performing differential coding on blocks of video data using non-linear quantization and modular arithmetic computation and then generating a codeword from a result of performing the differential coding.

In an embodiment, a system for video compression includes a video differential coder and a video codeword generator. The video differential coder is configured to perform differential coding on blocks of video data using non-linear quantization and modular arithmetic computation. The video codeword generator is configured to generate a codeword from a result of the differential coding.

In an embodiment, a method for video compression involves calculating a difference between a first block of video data and a second block of video data, where the first and second blocks of video data belong to neighboring groups of pixels of a video image, performing modular arithmetic computation on the difference between the first and second blocks of video data to generate a processed difference, comparing the processed difference with a non-linear table of quantization values, selecting a quantization value that is closest to the processed difference among the quantization values in the non-linear table, and generating a codeword in a fixed size based on the quantization value that is closest to the processed difference among the quantization values in the non-linear table.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

Figure 1:
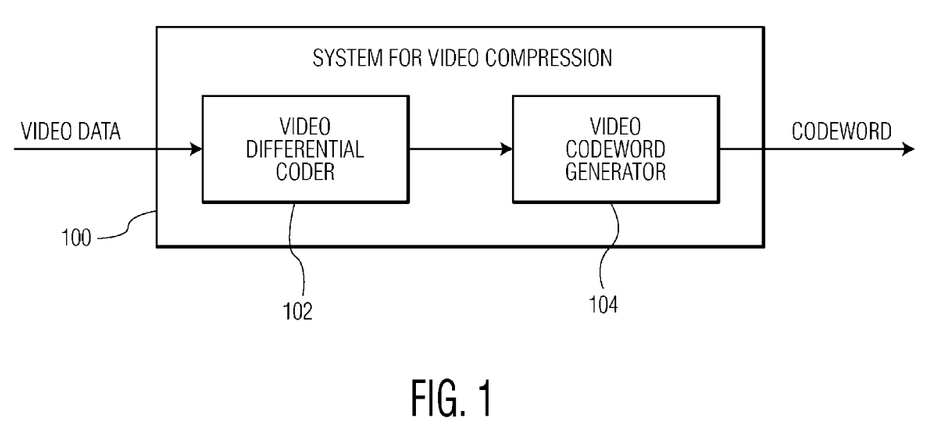
FIG. 1 is a schematic block diagram of a system for video compression in accordance with an embodiment of the invention.

FIG. 1 is a schematic block diagram of a system for video compression 100 in accordance with an embodiment of the invention. As shown in FIG. 1, the system for video compression includes a video differential coder 102 and a video codeword generator 104.

In the embodiment of FIG. 1, the system for video compression 100 processes blocks of video data to generate a codeword. For example, the system for video compression processes two blocks of video data to generate the codeword. The video data may include information of at least one video image. For example, the video data includes values of pixels in the video image. The video data are grouped into at least one block for sequential processing in the system of FIG. 1. Each block of video data may include a single pixel value or multiple pixel values. The generated codeword is used to represent a characteristic of the blocks of video data. In an embodiment, the generated codeword is used to represent the difference between the blocks of video data. The generated codeword is smaller than the blocks of video data such that the generated codeword occupies less computer medium storage space than the blocks of video data thus resulting in compression of the video data. The system for video compression may transmit the generated codeword to off-chip memory (not shown) for storage.

Because neighboring groups of pixels of a video image typically have similar values, the system for video compression 100 may use blocks of video data that belong to neighboring groups of pixels of a video image to increase compression efficiency. For example, the system for video compression uses video data from a line segment of a video image, which includes horizontally neighboring groups of video image pixels. Specifically, when compressing a block of video data that belongs to a target group of video image pixels, the system for video compression may use a block of video data that belongs to a group of video image pixels, which is the immediate left neighbor of the target group of video image pixels, as a reference block of video data. The system for video compression does not compress a block of video data that belongs to a first group of video image pixels that is at the left end of the line segment and compresses blocks of video data that belong to other groups of video image pixels in the line segment that are located to the right of the first group of video image pixels. In other words, the block of video data that belongs to the first group of video image pixels that is at the left end of the line segment is not compressed because there is no immediate left neighbor of the first group of video image pixels.

In the embodiment of FIG. 1, the video differential coder 102 is configured to perform differential coding on blocks of video data using non-linear quantization and modular arithmetic computation.

Lossless video compression and lossy video compression both can reduce the size of video data. However, compared to lossless video compression, lossy video compression, such as differential coding using modular arithmetic computation, typically achieves a better video compression ratio and therefore is desirable for multimedia systems. Lossy video compression can be implemented such that compression ratios are guaranteed while lossless video compression is best-effort with no guarantee on the compression ratios. Thus, compared to lossless video compression, lossy video compression allows an SoC memory interface between a multimedia SoC and off-chip memory to be downscaled while still maintaining the guarantee on the video compression ratios. Additionally, modular arithmetic computation can be efficiently implemented in video processing hardware by ignoring the highest bits of the computation result.

When lossy video compression such as differential coding is used, it is difficult to perfectly reconstruct original video data from the compressed video data. The reconstruction may result in a loss of some of the original video data, which can cause errors in the reconstructed video image. Errors are more noticeable for neighboring groups of pixels of a video image with small differences than for neighboring groups of pixels with large differences. The video differential coder 102 performs differential coding on blocks of video data using non-linear quantization to limit errors when differences between neighboring groups of pixels of a video image are small and to restrict errors to an acceptable level when the differences are large. As a result, the system for video compression 100 provides good video quality and enables a low cost implementation.

In the embodiment of FIG. 1, the video codeword generator 104 is configured to generate a codeword from a result of the differential coding by the video differential coder 102. The video codeword generator may convert the generated codeword into bits and transmit the converted bits to off-chip memory (not shown) for storage. In an embodiment, the codeword generated by the video codeword generator has a fixed size, for example, 4 bits, 6 bits, 8 bits, 10 bits, or 12 bits. Because fixed size coding of codewords can be efficiently implemented in a small silicon area, the video codeword generator of FIG. 1 saves silicon area and therefore reduces component cost, as opposed to a variable length codeword generator, which is harder to implement and requires more silicon area.

Figure 2:
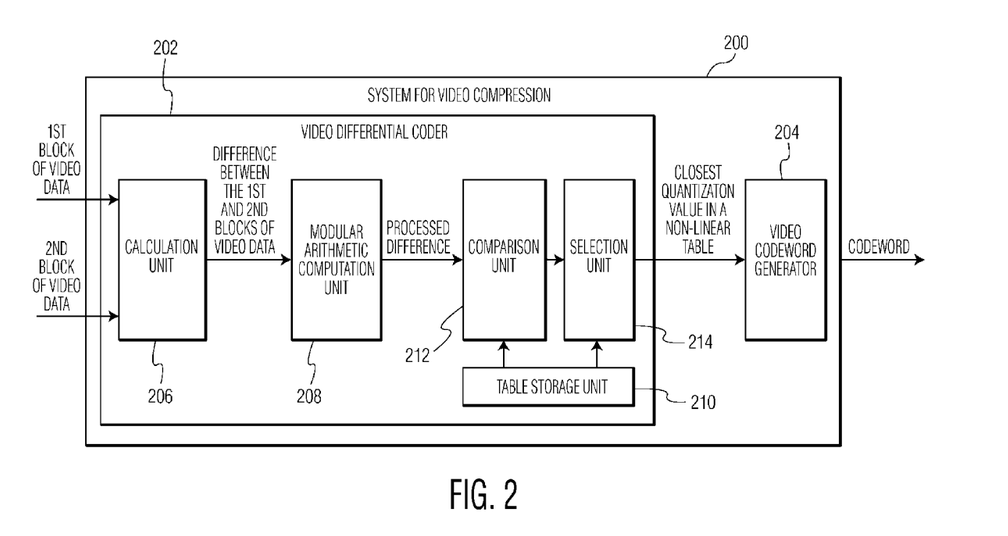
FIG. 2 depicts an exemplary embodiment of the system for video compression described with reference to FIG. 1.

An exemplary embodiment of the system for video compression 100 described above with reference to FIG. 1 is described below with reference to FIG. 2. As shown in FIG. 2, the system for video compression 200 includes a video differential coder 202 that is configured to perform differential coding on blocks of video data using non-linear quantization and modular arithmetic computation and a video codeword generator 204 that is configured to generate a codeword from a result of the differential coding.

In the embodiment of FIG. 2, the video differential coder 202 includes a calculation unit 206, a modular arithmetic computation unit 208, a table storage unit 210, a comparison unit 212, and a selection unit 214. Although the table storage unit is shown in FIG. 2 as being separate from the comparison unit and the selection unit, the table storage unit may be integrated into the comparison unit and/or the selection unit in other embodiments.

In the embodiment of FIG. 2, the calculation unit 206 is configured to calculate a difference between a first block of video data, also referred to as a reference block of video data and a second block of video data, also referred to as a block of video data that is currently being compressed. The reference block of video data typically includes video data that is previously decompressed. In an embodiment, the calculation unit subtracts the reference block of video data from the block of video data that is currently being compressed and the difference between the reference block of video data and the block of video data that is currently being compressed is equal to the block of video data that is currently being compressed minus the reference block of video data. In another embodiment, the calculation unit subtracts the block of video data that is currently being compressed from the reference block of video data and the difference between the reference block of video data and the block of video data that is currently being compressed is equal to the reference block of video data minus the block of video data that is currently being compressed.

In the embodiment of FIG. 2, the modular arithmetic computation unit 208 is configured to perform modular arithmetic computation on the difference between the reference block of video data and the block of video data that is currently being compressed to generate a processed difference. The processed difference is within a fixed range of values as a result of performing the modular arithmetic computation. Compared to an ordinary arithmetic computation unit that does not perform modular arithmetic computation, the modular arithmetic computation unit of FIG. 2 limits the range of the processed difference by ignoring the highest bits of the computation result. For example, the difference between the reference block of video data and the block of video data that is currently being compressed is between the value range [−255, 255] and the processed difference that is produced by the modular arithmetic computation unit is between the value range [−128,127].

In the embodiment of FIG. 2, the table storage unit 210 is configured to store a non-linear table of quantization values, where distances between every two quantization values that are closest to each other among the quantization values in the non-linear table are not the same. In an embodiment, a distance between a first pair of quantization values is smaller than a distance between a second pair of quantization values whose absolute values are larger than absolute values of the first pair of quantization values. Each of the quantization values in the non-linear table may have a unique index number, and a quantization value is larger than another quantization value whose index number is smaller than the index number of the quantization value. In an embodiment, a distance between two quantization values with adjacent index numbers is decreasing when the adjacent index numbers are increasing if the two quantization values are smaller than or equal to zero and a distance between two quantization values with adjacent index numbers is increasing when the adjacent index numbers are increasing if the two quantization values are larger than or equal to zero.

In the embodiment of FIG. 2, the comparison unit 212 is configured to compare the processed difference with the non-linear table of quantization values that is stored in the table storage unit and the selection unit 214 is configured to select a quantization value that is closest to the processed difference among the quantization values in the non-linear table that is stored in the table storage unit based on a comparison result from the comparison unit. In an embodiment, the selection unit selects a first quantization value that is closest to the processed difference among quantization values in the non-linear table that are larger than or equal to the processed difference and a second quantization value that is closest to the processed difference among quantization values in the non-linear table that are smaller than the processed difference. Then the comparison unit compares the first and second quantization values with the processed difference. Finally, the selection unit selects one of the first and second quantization values, where the selected quantization value is closer to the processed difference than the other quantization value of the first and second quantization values.

In some embodiments, the selection unit 214 is configured to select a quantization value that results in a reconstructed block of video data that is closer to the block of video data that is currently being compressed than the other quantization values in the non-linear table. For example, the modular arithmetic computation unit 208 performs modular arithmetic computations on the reference block of video data and more than one candidate of quantization values, respectively, to reconstruct multiple blocks of video data. Then the selection unit selects a quantization value that results in a reconstructed block of video data that is closest to the block of video data that is currently being compressed among the candidates of quantization values.

In the embodiment of FIG. 2, the video differential coder 202 outputs the selected quantization value to the video codeword generator 204 and the video codeword generator generates a codeword based on the selected quantization value. The video codeword generator may convert the generated codeword into bits and transmit the converted bits to off-chip memory (not shown) for storage. In an embodiment, the codeword generated by the video codeword generator has a fixed size, for example, 4 bits, 6 bits, 8 bits, 10 bits, or 12 bits.

Figure 3:
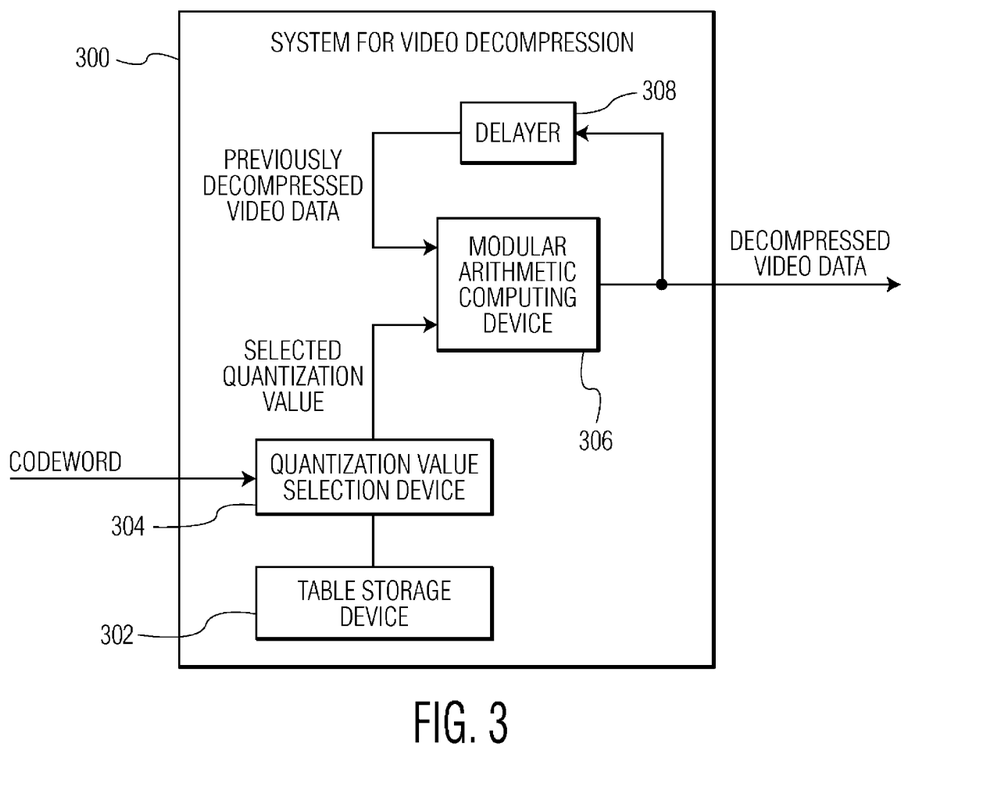
FIG. 3 is a schematic block diagram of a system for video decompression in accordance with an embodiment of the invention.

FIG. 3 is a schematic block diagram of a system for video decompression 300 in accordance with an embodiment of the invention. As shown in FIG. 3, the system for video decompression includes a table storage device 302, a quantization value selection device 304, a modular arithmetic computing device 306, and a delayer 308. In the embodiment of FIG. 3, the system for video decompression processes a codeword to generate a target block of video data.

In the embodiment of FIG. 3, the table storage device 302 is configured to store a non-linear table of quantization values. Although the table storage device is shown in FIG. 3 as being separate from the quantization value selection device 304 and the modular arithmetic computing device 306, the table storage device may be integrated into the quantization value selection device and/or the modular arithmetic computing device in other embodiments. In an embodiment, the system for video decompression 300 of FIG. 3 uses the same non-linear table of quantization values that is used for video compression. For example, the non-linear table of quantization values that is stored in the table storage device 302 of FIG. 3 is the same non-linear table of quantization values that is stored in the table storage unit 210 of FIG. 2.

In the embodiment of FIG. 3, the quantization value selection device 304 is configured to select a quantization value from the non-linear table of quantization values that is stored in the table storage device 302 and the modular arithmetic computing device 306 is configured to perform modular arithmetic computation on the selected quantization value and a reference block of video data, which is a block of video data that is previously decompressed from compressed video data, to generate the target block of video data. The delayer 308 is configured to delay the decompression result of the modular arithmetic computing device and to output the delayed decompression result to the modular arithmetic computing device as the reference block of video data. Because video decompression in the embodiment of FIG. 3 involves a simple table look-up operation and modular computation, the system for video decompression 300 of FIG. 3 can be efficiently implemented in a small silicon area, which translates to a low implementation cost.

Exemplary operations of the systems for video compression 100, 200 and the system for video decompression 300 described above with reference to FIGS. 1-3 are described as follows. In particular, an example operation of the system for video compression described with reference to FIG. 2 and an example operation of the system for video decompression described with reference to FIG. 3 are described by pseudo code excerpts below, respectively.

In the exemplary operations of video compression and video decompression, video data are from a line segment in a video image, which includes 1920 horizontally neighboring groups of video pixels. In the exemplary operation of video compression, a reference block of video data belongs to a group of video pixels that is the immediate left neighbor of another group of video pixels, which has a block of video data that is currently being compressed. In the exemplary operation of video decompression, a reference block of video data belongs to a group of video pixels that is the immediate left neighbor of another group of video pixels, which has a block of video data that is currently being reconstructed.

The pseudo code excerpt of video compression is as follows:

```
{
code_to_delta[17] = {-128, -98, -72, -50, -32, -18, -8, -2, 0, 2, 8, 18, 32, 50, 72, 98, 128};
#define Modulo_-128_127(x)  ((x > 127) ? (x - 256) : ((x < -128) ? (x + 256) : x))
#define Modulo_0_255(x)     ((x > 255) ? (x - 256) : ((x < 0) ? (x + 256) : x))
#define Error(x, y)         ((x < y) ? (y - x) : (x - y))
code FindBestCodeWord (recon_left_neigh, element)
{
Delta = element - recon_left_neigh;       // in the range [-255..255]
Delta = Modulo_-128_127 (Delta);          // in the range [-128..127]
// "Delta" in [-128, 127] range. Find the 2 surrounding delta values of "Delta".
code = 0;
while ((code < 16) && (code_to_delta[code] < Delta)) code++;
code_a = code - 1;
code_b = (code == 16) ? 0 : code;   // + 128 equals -128 in Modulo arithmetic
recon_a = Modulo_0_255 (recon_left_neigh + code_to_delta[code_a]);
recon_b = Modulo_0_255 (recon_left_neigh + code_to_delta[code_b]);
if (Error (element, recon_a) < Error (element, recon_b))
   return code_a;
else
   return code_b;
}
```

```
//Compress video elements
if (i == 0)
C(d_0) = d_0; // 8 bits to encode the first element, C stands for video compression
//a first group of pixels in a line segment has no left neighbour, therefore
//uncompressed
else {
C(d_i) = FindBestCodeWord (D(C(d_{i-1})), d_i); // 4 bits to encode code word [0..15]
// D stands for video decompression
}
```

The pseudo code excerpt of video decompression is as follows:

```
{
//Decompress video elements
if (i == 0)
D(C(d_0)) = C(d_0); //the first group of pixels in the line segment has no left
// neighbour, therefore uncompressed
else {
D(C(d_i)) = Modulo_0_255 (D(C(d_{i-1})) + code_to_delta[C(d_i)]);
    }
}
```

Figure 4:
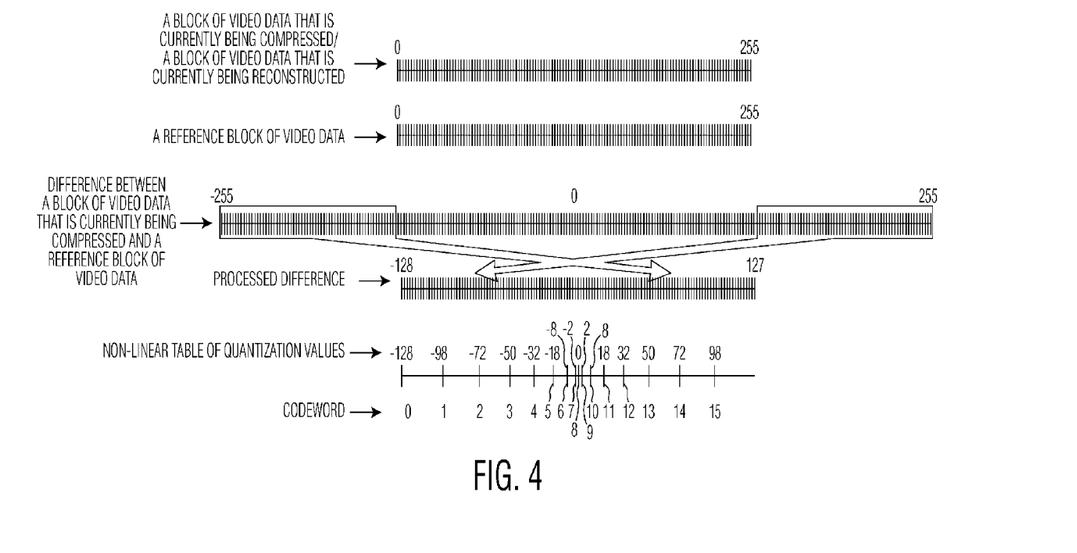
FIG. 4 depicts parameters for exemplary operations of the system for video compression and the system for video compression described above with reference to FIGS. 1-3.

Parameters for the above two exemplary operations of video compression and video decompression are depicted in FIG. 4. The parameters depicted in FIG. 4 include ranges of video data, quantization values, and codewords.

In the two exemplary operations of video compression and video decompression, each block of video data is within an 8-bit range between value "0" and value "255." The 8-bit range between value "0" and value "255" may represent a luminance component of a video image. For example, value "0" represents a black color, value "255" represents a white color, and values between value "0" and value "255" represent different shades of gray. FIG. 4 depicts a block of video data that is currently being compressed, a block of video data that is currently being reconstructed, and a reference block of video data are all within the 8-bit range of between value "0" and value "255."

A difference between a block of video data that is currently being compressed and a reference block of video data is also referred to as a "delta" value. As shown in FIG. 4, the difference between the block of video data that is currently being compressed and the reference block of video data is within a range between value "−255" and value "255." As a result of the modular arithmetic computation of video compression, the processed difference between the block of video data that is currently being compressed and the reference block of video data is between value "−128" and value "127." Thus, the range of the difference between the block of video data that is currently being compressed and the reference block of video data is reduced by a factor of 2.

In the two exemplary operations of video compression and video decompression, a non-linear table of quantization values includes 17 entries of quantization values, where each entry holds a quantization value and each entry has a unique index number between 0 and 16. The 17 quantization values, referred to as "code_to_delta" values, include "−128, −98, −72, −50, −32, −18, −8, −2, 0, 2, 8, 18, 32, 50, 72, 98, 128." A quantization value is larger than another quantization value whose index number is smaller than the index number of the quantization value. In this code example, the quantization value with the index number "0" is −128, the quantization value with the index number "1" is −98, the quantization value with the index number "2" is −72, the quantization value with the index number "3" is −50, the quantization value with the index number "4" is −32, the quantization value with the index number "5" is −18, the quantization value with the index number "6" is −8, the quantization value with the index number "7" is −2, the quantization value with the index number "8" is 0, the quantization value with the index number "9" is 2, the quantization value with the index number "10" is 8, the quantization value with the index number "11" is 18, the quantization value with the index number "12" is 32, the quantization value with the index number "13" is 50, the quantization value with the index number "14" is 72, the quantization value with the index number "15" is 98, and the quantization value with the index number "16" is 128. Each index number of the first 16 entries of quantization values represents a codeword and the index number "16" of the last quantization value 128 is not used as a codeword. Therefore, a total of 16 code words, which are between "0" and "15" both inclusive, can be encoded into 4 bits for video compression and video decompression. Because each block of video data is within an 8-bit range and each codeword can be encoded into 4 bits, a compression factor of around 2.0 can be achieved.

The difference between two adjacent quantization values is not constant. Specifically, the difference between two adjacent quantization values in a direction in which the index number is increasing is "30, 26, 22, 18, 14, 10, 6, 2, 2, 6, 10, 14, 18, 22, 26, 30," respectively, which includes symmetric parts "30, 26, 22, 18, 14, 10, 6, 2," and "2, 6, 10, 14, 18, 22, 26, 30." Additionally, a distance between a pair of quantization values is smaller than a distance between another pair of quantization values whose absolute values are larger than absolute values of the pair of quantization values. In other words, the non-linear table of quantization values makes relatively smaller steps between smaller quantization values and relatively larger steps between larger quantization values. With respect to the quantization values "−128, −98, −72, −50, −32, −18, −8, −2, 0," the corresponding distances between two quantization values with adjacent index numbers are "30, 26, 22, 18, 14, 10, 6, 2." That is, with respect to the quantization values that are smaller than or equal to zero, the distance between two quantization values with adjacent index numbers is decreasing when the adjacent index numbers are increasing. With respect to the quantization values "0, 2, 8, 18, 32, 50, 72, 98, 128," the corresponding distances between two quantization values with adjacent index numbers are "2, 6, 10, 14, 18, 22, 26, 30." That is, with respect to the quantization values that are larger than or equal to zero, the distance between two quantization values with adjacent index numbers is decreasing when the adjacent index numbers are increasing.

When quantized differential coding is used, it is usually not possible to perfectly reconstruct original video data from compressed video data. The reconstruction may result in a loss of some of the original video data, which can cause errors in the reconstructed video image. To humans, errors are more noticeable for neighboring groups of pixels of a video image with small differences than for neighboring groups of pixels with large differences. Because of the setup of the quantization values in the non-linear table, errors in the reconstructed video image are relatively small when differences between neighboring groups of pixels of a video image are small and the errors in the reconstructed video image are limited to an acceptable level when differences between neighboring groups of pixels of a video image are large. As a result, a good video quality can be achieved.

In the exemplary operation of video compression, a block of video data from a first group of video pixels at the left end of a line segment in a video image is not compressed and therefore it is encoded in 8 bits. For a successive group of video pixels that is located to the right of the first group of video pixels, the difference between a reconstructed reference block of video data and a block of video data that is currently being compressed is calculated. For a group of video pixels in the line segment that is located immediately next to the first group of video pixels, the reference block of video data is original video data that belongs to the first group of video pixels. For other groups of video pixels in the line segment that is located to the right of the first group of video pixels, the reference block of video data is reconstructed from compressed video data. The difference between the block of video data that is currently being compressed and the reference block of video data is within a range between a value "−255" and a value "255." A modular arithmetic computation is performed on the difference between the block of video data that is currently being compressed and the reference block of video data. After the modular arithmetic computation, the processed difference between the block of video data that is currently being compressed and the reference block of video data is within a range between a value "−128" and a value "127." Because the processed difference may lie in between two "code_to_delta" values "code_to_delta [code_a]" and "code_to_delta[code_b]" in the non-linear table, both "code_to_delta" values in the non-linear table are evaluated to identify a best "code_to_delta" value. In the exemplary operation of video compression, the best "code_to_delta" value is the one that results in a reconstructed block of video data ("recon_a" or "recon_b") that is closer to the block of video data that is currently being compressed than the other "code_to_delta" value. Then the index number of the best "code_to_delta" value is used as the codeword and encoded in 4 bits.

In the exemplary operation of video decompression, a block of video data from a first group of video pixels at the left end of a line segment in a video image is not compressed and therefore does not need to be decompressed. For a successive group of video pixels that is located to the right of the first group of video pixels, a quantization value from the non-linear table is located using the codeword. Then the quantization value is added to a reference block of video data and modular arithmetic computation is performed on the addition of the selected quantization value and the reference block of video data to reconstruct the block of video data that is currently being reconstructed.

Although in the above exemplary operations of video compression and video decompression the non-linear table of quantization values includes 17 entries, which correspond to 16 codewords, embodiments of the system and method for performing video compression and video decompression can use a non-linear table of quantization values with any number of entries and codewords.

Although blocks of video data in the above exemplary operations of video compression and video decompression are within an 8-bit range of between a value "0" and a value "255," embodiments of the system and method for performing video compression and video decompression can operate on blocks of video data in any bit range.

Figure 5:
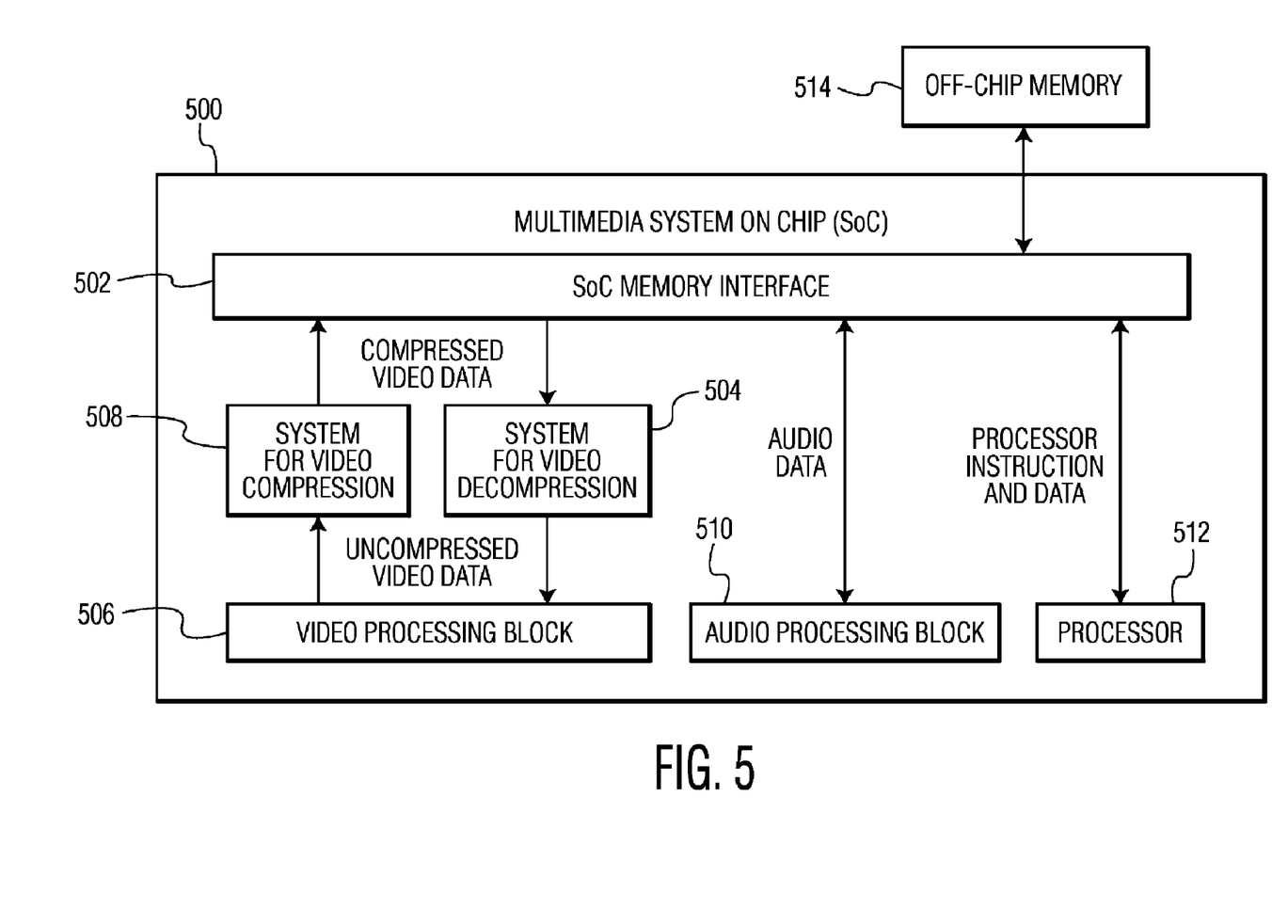
FIG. 5 is a schematic block diagram of a multimedia system on chip (SoC) in accordance with an embodiment of the invention.

FIG. 5 is a schematic block diagram of a multimedia system on chip (SoC) 500 in accordance with an embodiment of the invention. As shown in FIG. 5, the multimedia SoC includes an SoC memory interface 502, a system for video decompression 504, a video processing block 506, a system for video compression 508, an audio processing block 510, and a processor 512.

In the embodiment of FIG. 5, the multimedia SoC 500 processes multimedia data and communicates with off-chip memory 514 through the SoC memory interface 502. The off-chip memory such as synchronous dynamic random access memory (SDRAM) stores processor instructions and data, video data, and audio data.

The SoC memory interface 502 is configured to serve as a communication interface between the off-chip memory 514 and other components of the multimedia SoC 500. In particular, the SoC memory interface is configured to output processor instructions and data, video data, and audio data to the off-chip memory for temporary storage and to receive processor instructions and data, video data, and audio data that are stored in the off-chip memory.

The system for video decompression 504 is configured to decompress compressed video data that is received from the off-chip memory 514 through the SoC memory interface 502 to reconstruct original video data. The system for video decompression may be the system for video decompression 300 described above with reference to FIG. 3.

The video processing block 506 is configured to process reconstructed video data from the system for video decompression 504 to generate processed video data and to output some of the processed video data to the system for video compression 508.

The system for video compression 508 is configured to compress the processed video data that is received from the video processing block 506 and to generate compressed video data. The system for video compression may be the systems for video compression 100, 200 described above with reference to FIGS. 1 and 2, respectively.

The audio processing block 510 is configured to process audio data that is received from the off-chip memory 514 through the SoC memory interface 502 to generate processed video data and to output some of the processed video data to the off-chip memory through the SoC memory interface for temporary storage.

The processor 512 is configured to operate according to processor instructions and data that are received from the off-chip memory 514 through the SoC memory interface 502 and to output some processor instructions and data to the off-chip memory through the SoC memory interface for temporary storage.

Figure 6:
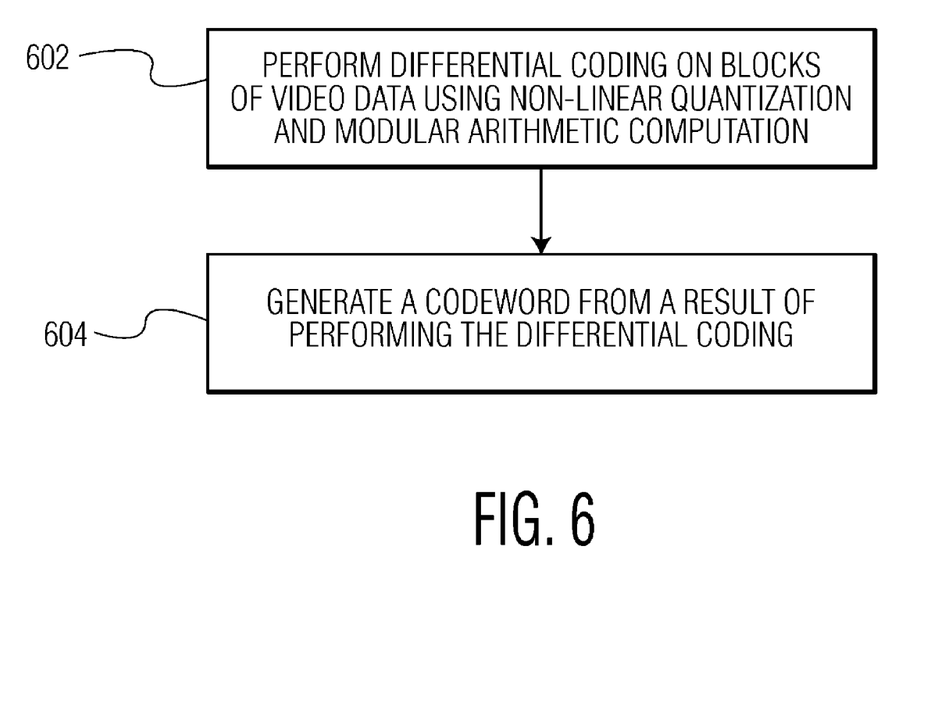
FIG. 6 is a process flow diagram of a method for video compression in accordance with an embodiment of the invention.

FIG. 6 is a process flow diagram of a method for video compression in accordance with an embodiment of the invention. At block 602, differential coding is performed on blocks of video data using non-linear quantization and modular arithmetic computation. At block 604, a codeword is generated from a result of performing the differential coding.

Embodiments of the system and method for performing video compression and video decompression can be applied to multimedia systems such as televisions, set-top boxes, Digital Versatile/Video Disc (DVD) players, and blu-ray players. In particular, embodiments of the system and method for performing video compression and video decompression can be implemented in multimedia systems on chip (SoC).

Embodiments of the system and method for performing video compression and video decompression can not only reduce the silicon area required for system implementation so as to reduce component cost but also allow for a high operating frequency or an ability to compress or decompress multiple blocks of video data per clock cycle.

The various components or units of the embodiments that have been described or depicted may be implemented in software that is stored in a computer readable medium, hardware, firmware, or a combination of software that is stored in a computer readable medium, hardware, and firmware.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention that have been described or depicted include several components described or depicted herein, other embodiments of the invention may include fewer or more components to implement less or more functionality.

Although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for video compression, the method comprising:
    performing differential coding on blocks of video data using non-linear quantization and modular arithmetic computation; and
    generating a codeword from a result of performing the differential coding,
    wherein performing the differential coding comprises calculating a difference between a first block of video data and a second block of video data, performing modular arithmetic computation on the difference between the first and second blocks of video data to generate a processed difference, comparing the processed difference with a non-linear table of quantization values, and selecting a quantization value that is closest to the processed difference among the quantization values in the non-linear table, wherein selecting the quantization value comprises selecting a first quantization value that is closest to the processed difference among quantization values that are larger than or equal to the processed difference, selecting a second quantization value that is closest to the processed difference among quantization values that are smaller than the processed difference, and selecting one of the first and second quantization values, wherein the selected quantization value is closer to the processed difference than the other quantization value of the first and second quantization values.

2. The method of claim 1, wherein generating the codeword comprises generating the codeword such that a size of the codeword is constant.

3. The method of claim 1, wherein the processed difference is within a fixed range of values as a result of performing the modular arithmetic computation.

4. The method of claim 1, wherein the first and second blocks of video data belong to neighboring groups of pixels of a video image.

5. The method of claim 1, wherein none of the blocks of video data comprises video data that is decompressed from compressed video data.

6. The method of claim 1, wherein one of the blocks of video data comprises reconstructed video data that is decompressed from compressed video data.

7. The method of claim 1, wherein generating the codeword comprises generating the codeword based on the quantization value that is closest to the processed difference among the quantization values in the non-linear table.

8. The method of claim 1, wherein the processed difference is within a range of the quantization values in the non-linear table as a result of performing the modular arithmetic computation.

9. The method of claim 8, wherein distances between every two quantization values that are closest to each other among the quantization values in the non-linear table are not the same.

10. The method of claim 9, wherein a distance between a first pair of quantization values is smaller than a distance between a second pair of quantization values whose absolute values are larger than absolute values of the first pair of quantization values.

11. The method of claim 10, wherein each of the quantization values in the non-linear table has a unique index number, and wherein a quantization value is larger than another quantization value whose index number is smaller than the index number of the quantization value.

12. The method of claim 11, wherein a distance between two quantization values with adjacent index numbers is decreasing when the adjacent index numbers are increasing, if the two quantization values are smaller than or equal to zero.

13. The method of claim 12, wherein a distance between two quantization values with adjacent index numbers is increasing when the adjacent index numbers are increasing, if the two quantization values are larger than or equal to zero.

14. A system for video compression, the system comprising:
    a video differential coder configured to perform differential coding on blocks of video data using non-linear quantization and modular arithmetic computation; and
    a video codeword generator configured to generate a codeword from a result of the differential coding,
    wherein the video differential coder comprises:
    a calculation unit configured to calculate a difference between a first block of video data and a second block of video data, wherein the first and second blocks of video data belong to neighboring groups of pixels of a video image;
    a modular arithmetic computation unit configured to perform modular arithmetic computation on the difference between the first and second blocks of video data to generate a processed difference, wherein the processed difference is within a fixed range of values as a result of the modular arithmetic computation;
    a comparison unit configured to compare the processed difference with a non-linear table of quantization values, wherein a distance between a first pair of quantization values is smaller than a distance between a second pair of quantization values whose absolute values are larger than absolute values of the first pair of quantization values; and
    a selection unit configured to select a quantization value that is closest to the processed difference among the quantization values in the non-linear table, wherein the selection unit is further configured to select a first quantization value that is closest to the processed difference among quantization values that are larger than or equal to the processed difference, select a second quantization value that is closest to the processed difference among quantization values that are smaller than the processed difference, and select one of the first and second quantization values, wherein the selected quantization value is closer to the processed difference than the other quantization value of the first and second quantization values.

15. A method for video compression, the method comprising:

performing differential coding on blocks of video data using non-linear quantization and modular arithmetic computation; and generating a codeword from a result of performing the differential coding, wherein performing the differential coding comprises calculating a difference between a first block of video data and a second block of video data, performing modular arithmetic computation on the difference between the first and second blocks of video data to generate a processed difference, comparing the processed difference with a non-linear table of quantization values, and selecting a quantization value that is closest to the processed difference among the quantization values in the non-linear table, wherein the processed difference is within a range of the quantization values in the non-linear table as a result of performing the modular arithmetic computation, wherein distances between every two quantization values that are closest to each other among the quantization values in the non-linear table are not the same, wherein a distance between a first pair of quantization values is smaller than a distance between a second pair of quantization values whose absolute values are larger than absolute values of the first pair of quantization values, wherein each of the quantization values in the non-linear table has a unique index number, and wherein a quantization value is larger than another quantization value whose index number is smaller than the index number of the quantization value.

16. The method of claim 15, wherein a distance between two quantization values with adjacent index numbers is decreasing when the adjacent index numbers are increasing, if the two quantization values are smaller than or equal to zero.

17. The method of claim 16, wherein a distance between two quantization values with adjacent index numbers is increasing when the adjacent index numbers are increasing, if the two quantization values are larger than or equal to zero.

* * * * *